United States Patent [19]

Mollenkopf et al.

[11] Patent Number: 5,349,135
[45] Date of Patent: Sep. 20, 1994

[54] FASTENER FOR ELECTRICAL POWER DISTRIBUTION IN DIVIDER PANELS

[75] Inventors: Lloyd C. Mollenkopf, Apple Valley; Russsell J. Rein, St. Louis Park, both of Minn.

[73] Assignee: Rosemount Office Systems, Inc., Lakeville, Minn.

[21] Appl. No.: 895,349

[22] Filed: Jun. 8, 1992

[51] Int. Cl.$^5$ .......................... H02G 3/28; H01R 9/22; E04B 2/46
[52] U.S. Cl. ..................... 174/48; 52/220.7; 439/215
[58] Field of Search .............. 174/48, 49; 52/173.1, 52/220.1, 220.5, 220.7, 239, 242, 280, 750; 160/127, 135, 351; 439/215, 216

[56] References Cited

U.S. PATENT DOCUMENTS

| | | | |
|---|---|---|---|
| Re. 31,733 | 11/1984 | Haworth et al. | 52/221 X |
| 2,295,304 | 9/1942 | Stoddard et al. | |
| 2,654,449 | 10/1953 | Beamer et al. | |
| 2,841,452 | 7/1958 | Borgman et al. | |
| 3,688,458 | 9/1972 | Inmon et al. | 52/280 |
| 3,791,096 | 2/1974 | Epperlein | 52/758 |
| 3,919,457 | 11/1975 | Steiner | 174/48 |
| 4,270,020 | 5/1981 | Kenworthy et al. | 174/48 |
| 4,278,834 | 7/1981 | Boundy | 174/48 |
| 4,367,370 | 1/1983 | Wilson et al. | 174/48 |
| 4,449,337 | 5/1984 | Gzym et al. | 52/126 |
| 4,593,505 | 6/1986 | Russell | 52/221 |
| 4,634,212 | 1/1987 | Boundy et al. | 174/48 X |
| 4,918,886 | 4/1990 | Benoit et al. | 52/221 |
| 5,020,290 | 6/1991 | Hajjar | 52/242 |
| 5,059,132 | 10/1991 | Skowronski et al. | 439/215 X |
| 5,091,607 | 2/1992 | Stob | 174/48 |

FOREIGN PATENT DOCUMENTS 2059183 7/1980 United Kingdom .................. 174/48

*Primary Examiner*—Peter Dungba Vo
*Attorney, Agent, or Firm*—Westman, Champlin & Kelly

[57] ABSTRACT

An apparatus to fasten panel electrical distribution units to divider panels. Mounting tabs are formed from a panel bracket. Mounting ears with holes to receive the mounting tabs and a slidable locking member with openings to receive the mounting tabs are carried on the panel distribution unit. The mounting tabs are inserted through the holes and openings, and the lock member is then moved to a locked position. The slidable lock member contains a spring member which provides positive friction force to keep the lock member in its locked position.

20 Claims, 4 Drawing Sheets

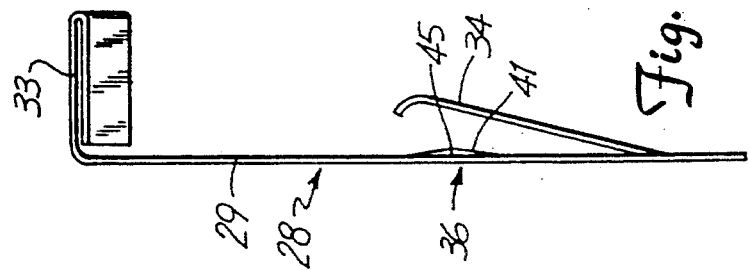
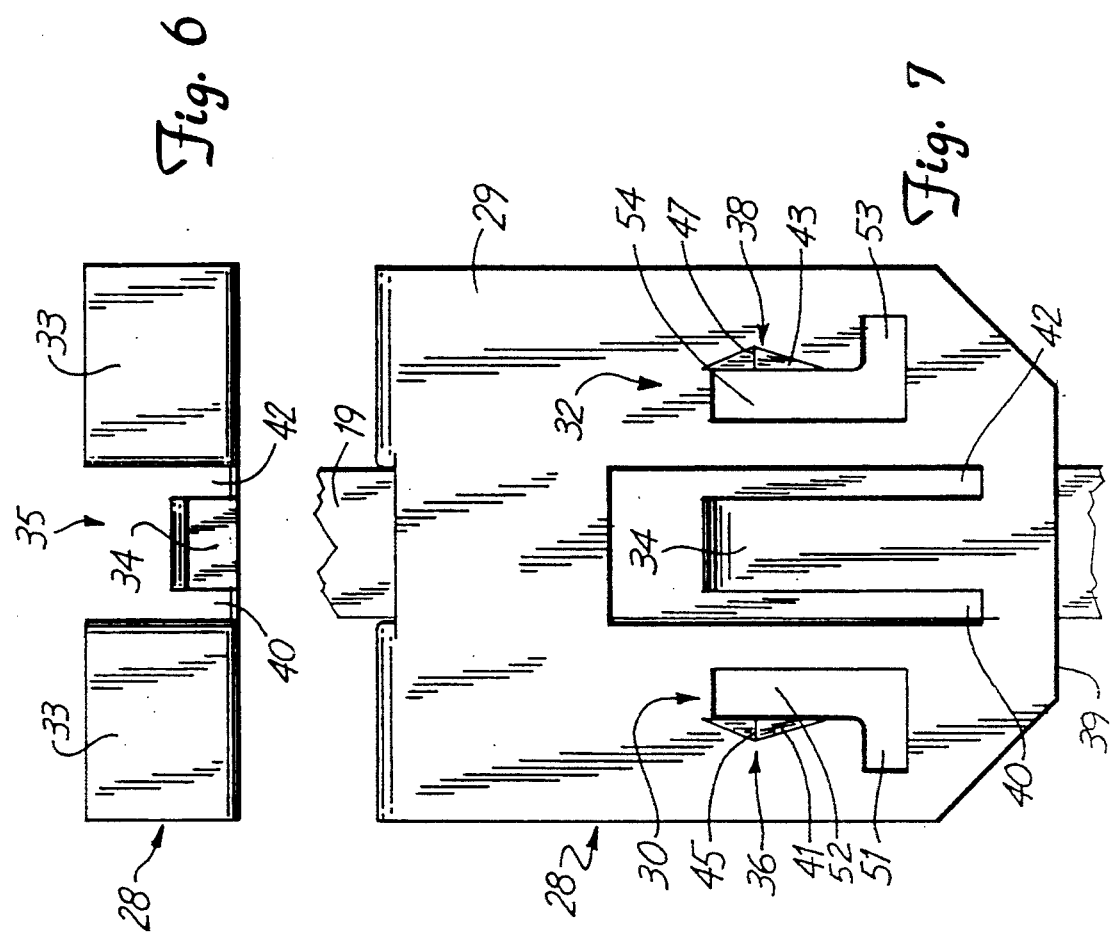

1

FASTENER FOR ELECTRICAL POWER DISTRIBUTION IN DIVIDER PANELS

BACKGROUND OF THE INVENTION

The present invention relates to a method and apparatus for fastening electrical power distribution systems in interior space divider wall panels.

Divider wall panels and connectors for dividing interior space are well known. Panels preferably carry electrical power for task use. Several prior panel systems have electrical raceways but have complex mounting systems for the outlets and other electrical components. U.S. Pat. No. 4,593,505 utilizes screws or bolts to secure an electrical raceway frame to the bottom of a wall panel. Other mounting arrangements for power panels and raceways are shown in U.S. Pat. No. 4,367,320 and in U.S. Pat. No. 4,377,724.

It is desired to have an easily constructed system for fastening electrical power distribution systems with no extra parts and in which no tools are needed. This is desired because the electrical systems will be installed in the field, where time and convenience are of great importance.

SUMMARY OF THE INVENTION

The present invention relates to a fastener for electrical power distribution systems in divider panels. Electrical power distribution systems allow divider wall panels to be utilized more efficiently as walls with the capability of mounting electrical outlet boxes onto them. The electrical power distribution systems do this by electrically coupling each distribution unit together, thus carrying electrical power to each of the connected units. With the ability to mount outlet boxes onto selected divider panels, computers and lamps may be plugged into the sockets in the wall panels as opposed to stringing extension cords from a wall outlet. This improves the looks of the area and is safer.

The electrical power distribution system for each individual panel includes a pair of connecting assemblies connected with wires and held rigidly together with a tube or a sleeve. The tube or sleeve carries a means for fastening the tube or sleeve to a panel frame. This is called a panel distribution unit.

The fastener of the present invention is designed to hold the panel distribution unit securely in place in a raceway below the divider panel frame and can be installed or removed without using any additional parts and without requiring the use of tools. This is achieved by utilizing formed L shaped lock tabs on the underside of a divider panel bracket which are inserted through holes in a bracket on the rigid tube of the panel distribution unit and retained by locking a slidable lock member.

The base of the divider panel is provided with a panel bracket that extends along the lower edge of the divider panel. The underside of the panel bracket has formed tabs to fasten the panel distribution unit onto the panel. The panel distribution unit to be fastened to the panel is positioned below the panel. A bracket assembly is mounted to a tubular portion of the panel distribution unit. A slidable lock member which has holes cut out to receive the tabs on the underside of the panel bracket is interlocked with the bracket assembly. The bracket assembly has formed ears above and adjacent to the slidable lock member which retain the slidable lock member for sliding movement. These ears also have holes cut out, of a size and shape to receive the tabs on the underside of the panel bracket.

The slidable lock member has a formed spring member which slides along the tubular member of the panel distribution unit providing an upward force on the slidable locking member causing it to frictionally contact the ears of the bracket assembly, thus frictionally holding the slidable lock member in its present position. Two dimples are also formed on the slidable lock member. These dimples are formed alongside the holes and help positively lock the member in place when the slidable lock member is moved to its locked position.

The formed tabs on the underside of the panel brackets are inserted through the holes of the bracket assembly mounting ears and also through the holes of the slidable lock member. The lock member is then slid into its locked position which traps the tabs and prevents the tabs from pulling out, thus fastening the panel distribution unit in place.

BRIEF DESCRIPTION OF THE DRAWINGS

FIG. 6 is a an end plan view of the slidable locking member.

FIG. 7 is a top plan view of the slidable locking member.

FIG. 8 is a side plan view of the slidable locking member.

DETAILED DESCRIPTION OF THE PREFERRED EMBODIMENTS

Figure 1:
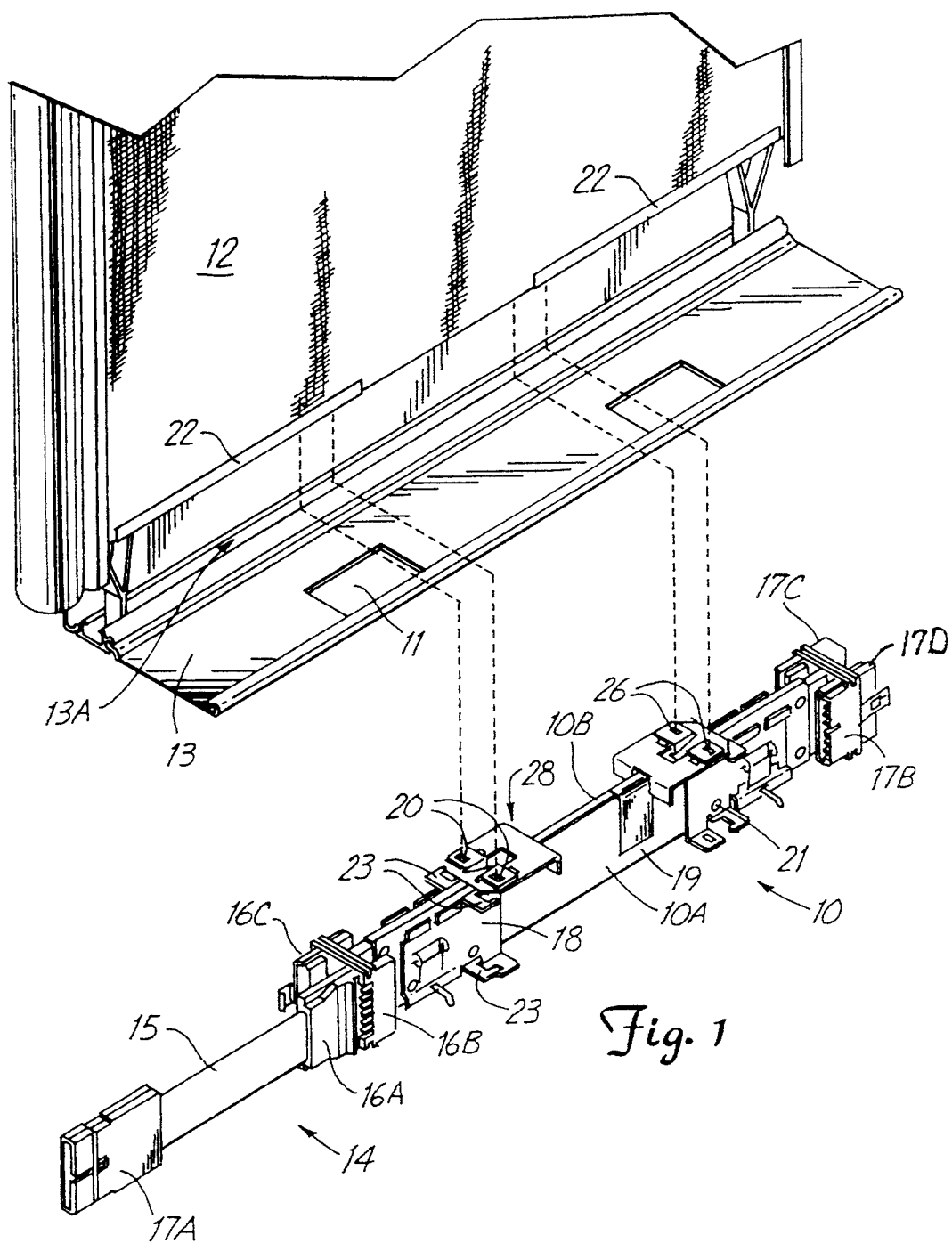
FIG. 1 is a perspective view of the electrical power distribution system and divider panel made according to the present invention.

An individual panel electrical distribution unit is shown generally at 10 in FIG. 1. Panel electrical distribution units (panel distribution units) for a series of connected divider panels permit mounting of electrical outlet boxes on the panels. With the ability to mount outlet boxes into the divider panels, computers and lamps and other power equipment may be plugged into the sockets in the panels as opposed to stringing extension cords from a wall outlet as is the case with non-electrified divider panels. This improves the looks of the area and is safer than having extension cords strung across a room.

A series of panel distribution units may be electrically coupled together, thus carrying electrical current to each of the connected units allowing outlet boxes to be mounted onto each panel distribution unit. In the present invention, multiple wall panels or divider panels 12 are connected together in a known manner. Referring again to FIG. 1, the panel distribution unit 10 is connected to another panel distribution unit by a coupling shown generally at 14. Coupling 14 comprises electrical connectors 16A and 17A which are electrically connected by a molded flexible wire harness 15. The electrical connectors 36A and are a standard type known to those familiar in the art. The wire harness 15 is flexible to allow divider panels 12 to be positioned at any angle from one another.

The divider panels 12 of the present invention are of a standard type divider panel with a removable electrical raceway cover 13 that covers a longitudinally extending raceway 13A. The raceway cover 13 extends the length of the panel 12 and has holes 11 cut out for electrical outlet boxes.

Figure 2:
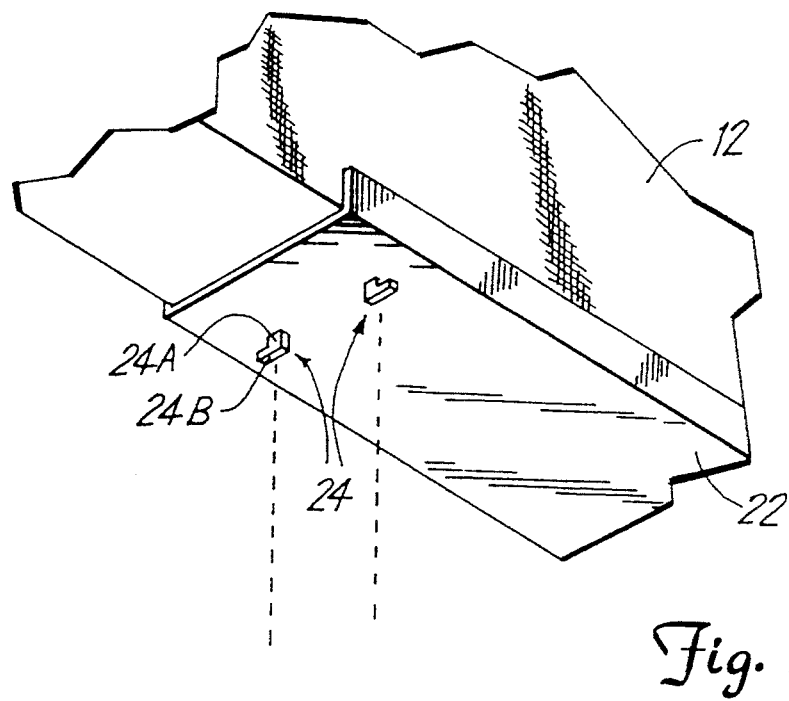
FIG. 2 is an enlarged perspective view the formed tabs.

A pair of panel support brackets 22 mounted to the base of the wall panel 12 inside the raceway 13A. Mounting tabs 24 are formed on the underside of the support brackets 22 and extend downwardly and are used to removably secure the panel distribution unit 10 to the panel 12 inside the raceway 13A. As can be seen in FIG. 2, the mounting tabs 24 are notched out of the support bracket 22 and bent downward. These mounting tabs 24 are of a size and strength to support the panel distribution unit 10. The mounting tabs 24 used in the preferred embodiment are L-shaped tabs having shanks 24A and ends 24B, but many shapes and sizes of shanks and ends may be utilized.

The panel distribution unit 10 to be mounted to the wall panel 12 comprises coupling connectors 16B, 16C, 17B, and 17C at the end of each unit, a rigid tubular member 19, and a mounting bracket assembly 18. The connectors 16B & C and 17B & C, like the connectors 16A and 17A of the coupling 14, are integrally molded assemblies that are connected by wires which are molded into place in the flexible wire harness 15. The coupling connectors 16B and 17B provide power for the outlet boxes on their respective side of the panel distribution unit 10 shown in FIG. 1 as 10A, and also to the opposite side shown as 10B. Coupling connector 17A plugs into 17C of an adjacent panel distribution unit. Connectors 16C and 17D are available in the event that two panel distribution units are desired to be connected to a single panel distribution unit.

Tubular member 19 is a rigid support having a chamber which carries electrical wiring to outlet boxes and to the coupling connectors 16B & C and 17B & C. The bracket assemblies 18 are mounted on the tubular member 19 near the coupling connectors 16B & C and 17B & C. Fasteners 21 of a type well known secure the bracket assemblies 18 to the tubular member 19. Tabs 23 are also formed from the bracket assembly 18. The tabs 23 are formed near the upper and lower edges of the bracket assembly 18 and are perpendicular to the sides of, and extend outward from the tubular member 19. The bracket assemblies 18 and the tabs 23 are formed to enable outlet boxes to be mounted to them in a way known to those skilled in the art.

Mounting ears 20 are formed on the upper edge of the bracket assembly 18, positioned toward the center of the panel 12 from the tabs 23 and at a level above the tabs 23. The mounting ears 20 are formed to lie in a horizontal plane perpendicular to the sides of the tubular member 19 and extending outward from the tubular member 19, parallel to tabs 23. The mounting ears 20 are of a size and strength to support and secure the panel distribution unit to the mounting tabs 24. Holes 26 are formed in the mounting ears 20 and are of size to allow the mounting tabs 24 to be inserted through the holes 26 when the panel distribution unit 10 is placed in the raceway 13A.

The slidable lock member 28, which is the only moving part of the present invention, is slidably mounted under the mounting ears 20 and above the top the tubular member 19. As shown in FIG. 7, the slidable lock member 28 has a main portion 29 which has two L-shaped openings 30 and 32 formed therein, and has an integral formed flat spring member 34 depending from the main portion 29. The spring member 34 is formed by slots 40 and 42. The slidable lock member 28 is positioned so the spring member 34 slidably contacts the tubular member 19 and the mounting ears 20 are adjacent to and above the L-shaped openings 30 and 32. When assembled, each mounting ear 20 on each bracket 18 fits through one of the slots 40 and 42 and the lock member 28 can slide relative to the mounting ears 20. The main portion of the slidable lock member 28 also has tabs 33 bent down to form a guide channel 35 which receives the tubular member 19, as seen in FIG. 6. The guide channel 35 guides the lock member 28 as it is slid between its locked and unlocked positions.

Figure 5:
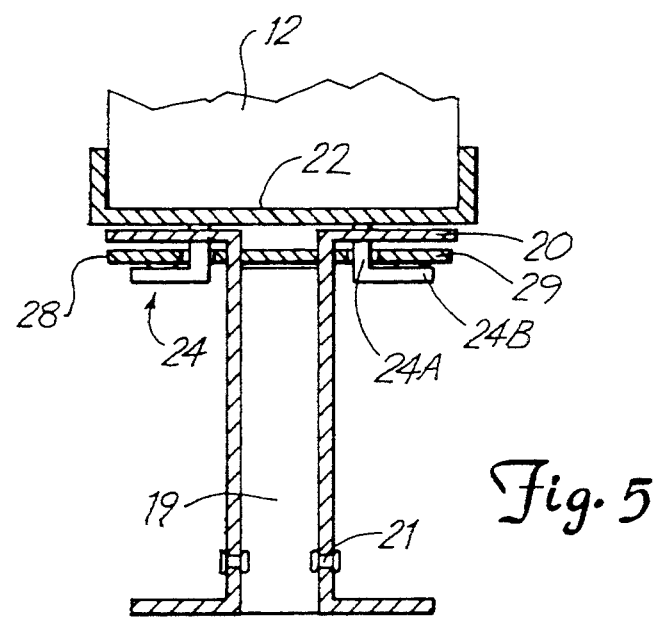
FIG. 5 is a sectional view taken along line 5—5 in FIG. 4 shown with tabs inserted.

The spring member 34 is provided to create a positive friction force to lock the slidable lock member 28 and the mounting ears 20 between the mounting tabs 24 and the underside of the support bracket 22 as can be seen in FIG. 5. The spring 34 creates a positive friction force by forcing the slidable lock member 28 upwards to contact the mounting ears 20. The slidable lock member also has two dimple depressions 36 and 38 to help positively lock the panel distribution unit 10 in place.

In this embodiment, the slidable lock member 28 is made from 0.02" thick 1075 spring steel. The spring member 34 is approximately 0.3" wide and is formed to make approximately a 25° angle with the lock member 28.

Figure 3:
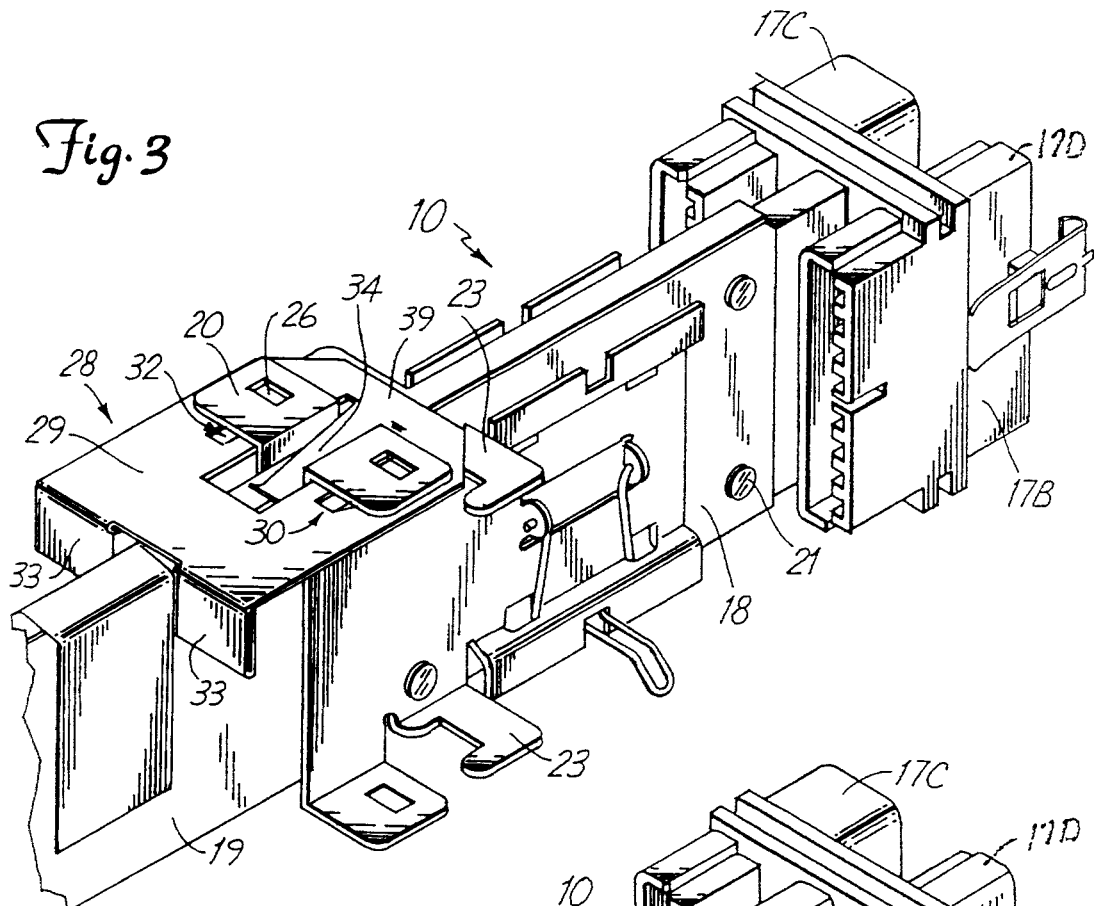
FIG. 3 is an enlarged perspective view the locking mechanism in the unlocked position.

When the lock member 28 is in its unlocked position as is seen in FIG. 3, the lock member 28 is positioned so that end portions 51 and 53 of the L-shaped openings 30 and 32 are directly below and aligned with the holes 26 in the mounting ears 20 of the bracket assembly 18. When in this unlocked position, the upward force of the spring member 34 and the resilient force at the mounting ears 20 causes the end by tabs 33 to be raised slightly away from the panel distribution unit 10.

To lock the panel distribution unit 10 in place when it is positioned under the wall panel 12 in the raceway 13A, the mounting tabs 24 are inserted through the holes of the mounting ears 20 and the openings 30 and 32 of the slidable lock member 28 while the lock member is in its unlocked position. The lock member 28 is then slid to its locked position which is in the direction of the coupling connectors 16B & C and 17B & C. Leg portions 52 and 54 of the openings 30 and 32 are narrower than ends 51 and 53 and slide along the shanks 24A of the tabs 24 retaining the ends 24B below the lock member 28. Placing the lock member 28 in its locked position results in the mounting ears 20 being closer to the end by tabs 33 of the lock member 28, which due to the forces on the lock member 28 cause the end by the tabs 33 to be lowered into proximity with the top of the tubular member 19.

The two dimple depressions 36 and 38, as can be seen in FIGS. 5, 7, and 8, are formed in the main portion 29 of the lock member 28 to help positively hold the lock member 28 in its locked position and thus positively lock the panel distribution unit 10 in place. When the slidable lock member 28 is being moved into its locked position from its unlocked position, the dimple depressions 36 and 38 come into contact with the tabs 24. The depressions 36 and 38 are wedge shaped, thus greater force is required to move the lock member 28 into its locked position as inclined surfaces 41 and 43 slide along the upper edge of the base 24B of the tabs 24.

Figure 4:
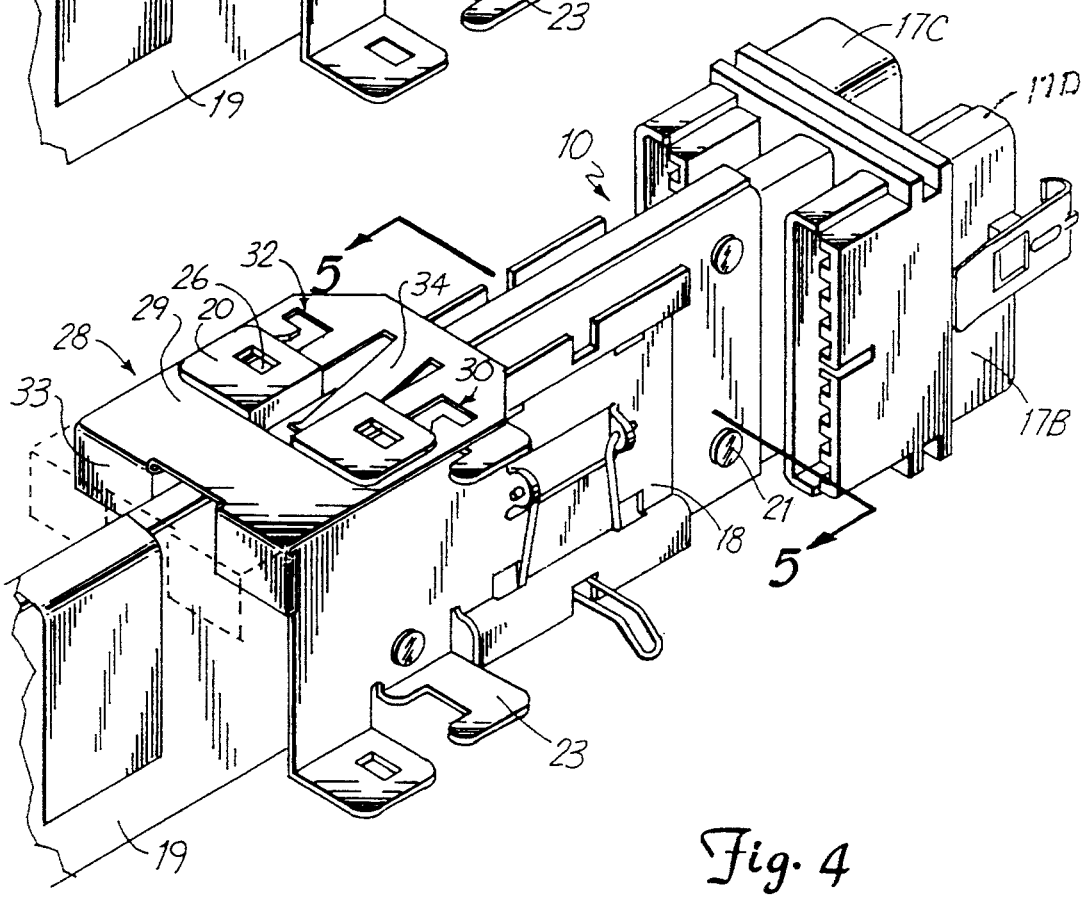
FIG. 4 is an enlarged perspective view of the locking mechanism in a locked position.

When the lock member 28 has been moved far enough into its locked position bottom edges 45 and 47 of the dimple depressions 36 and 38 will ride over the ends 24B of the tabs 24, thus reducing the effort needed to move the lock member 28. When this point is reached an operator knows the lock member 28 is in its locked position as shown in FIG. 4.

Not only is the panel distribution unit 10, as just described, easy to lock into place, it is easy to unlock and remove. To remove, the locking member 28 is slid to the unlocked position and the tabs 24 are removed, thus allowing the panel distribution unit to be moved.

Although the present invention has been described with reference to preferred embodiments, workers skilled in the art will recognize that changes may be made in form and detail without departing from the spirit and scope of the invention.

What is claimed is:

1. An apparatus for fastening separable utility distribution units on divider panels comprising:
    a bracket adapted to be mounted to a bottom of a divider panel and having a depending tab with an outer end that forms a lock;
    movable slide locking means carried on a panel distribution unit and having first a tab receiving opening;
    fixed receiving means mounted to the panel distribution unit mounted adjacent to the movable slide locking means and having at least one second opening aligning with the tab receiving opening for receiving the depending tab and the outer end, the movable locking means being movable from a position permitting the outer end to pass through the first and second openings to a locked position to prevent the outer end from passing out of the first tab receiving opening to thereby retain the tab in the opening; and
    a detent to retain the movable slide locking means in locked position.

2. The apparatus of claim 1 wherein the mounting means comprises a divider panel bracket with formed mounting tabs thereon.

3. The apparatus of claim 2 wherein the formed tabs are L-shaped.

4. The apparatus as in claim 1 wherein the movable slide locking means comprises a spring member, the spring member frictionally holding the movable slide locking means in place.

5. The apparatus as in claim 1 wherein the detent means are dimple depressions.

6. The apparatus as in claim 4 wherein the mounting means receiving openings are L-shaped.

7. The apparatus as in claim 4 wherein the spring member is frictionally in contact with a portion of the panel distribution unit and forces the movable locking means upward into contact with the fixed receiving means.

8. The apparatus as in claim 4 wherein the spring member is formed from spring steel.

9. The apparatus as in claim 1 wherein the fixed receiving means for receiving the tab of the bracket comprises at least one mounting ear having the second opening to receive the tab.

10. An apparatus for fastening a panel distribution unit to a divider panel comprising:
    a panel bracket mounted to a lower edge of the divider panel, the panel bracket having mounting tabs formed thereon to have a shank and an end portion; and
    a panel distribution unit carrying a bracket assembly including a slidable lock member, the bracket assembly having formed mounting ears with openings to receive the mounting tabs, the lock member having means for providing a frictional locking force and having lock openings with two port ions to receive the mounting tabs, a first portion of the lock openings being of size to permit the end portion of the mounting tabs to pass therethrough and a second portion of the lock openings slidably fitting over the shank of the mounting tabs as the lock member moves to a second position, the second portion of the lock openings being narrower than the end portion of the mounting tab to trap the mounting tab on an opposite side of the lock member from the panel bracket.

11. The apparatus as in claim 10 wherein the mounting tabs are L-shaped tabs.

12. The apparatus as in claim 10 wherein the mounting ears are formed through slots of the lock member, the mounting ears being adjacent to and above the lock member and substantially parallel to the panel bracket.

13. The apparatus as in claim 10 wherein the openings in the lock member are L-shaped.

14. The apparatus as in claim 10 wherein the spring member is formed from spring steel and frictionally slides upon the panel distribution unit, the spring member forces the lock member upwards into frictional contact with the mounting ears.

15. An apparatus for fastening panel distribution units to divider panels comprising:
    a plurality of panel brackets mounted to an end of a divider panel, said panel brackets having mounting tabs formed thereon; and
    a panel distribution unit carrying a bracket assembly integrally contacting a slidable lock member, the bracket assembly having formed mounting ears with openings to receive the mounting tabs, the slidable lock member having a spring member to provide a frictional locking force and dimple depressions which when the lock member is slid to a locking position contact a portion of the mounting tabs to positively lock the slidable lock member in a desired position with the tabs passing through the openings in mounting ears.

16. The apparatus as in claim 15 wherein the mounting tabs are L-shaped tabs.

17. The apparatus as in claim 15 wherein the mounting ears are formed through slots of the lock member, the mounting ears being adjacent to and above the lock member and substantially parallel to the panel bracket.

18. The apparatus as in claim 15 wherein the openings in the lock member are L-shaped.

19. The apparatus as in claim 15 wherein the spring member is formed from spring steel and frictionally slides upon the panel distribution unit, the spring member forces the lock member upwards into frictional contact with the mounting ears.

20. An apparatus for fastening utility distribution units on divider panels comprising:
    mounting means mounted to a bottom of a divider panel;
    movable locking means carried on a panel distribution unit, the movable locking means comprising mounting means receiving openings and a spring member, the spring member frictionally holding the mounting means in place, and a detent adjacent to the mounting means receiving openings to detent the movable locking means in a locked position; and fixed receiving means mounted to the panel distribution unit mounted adjacent to the movable locking means and having at least one opening for receiving the mounting means, the movable locking means being movable to retain the mounting means received in the opening of the receiving means.

* * * * *